Reynolds & Bachelder,
Journal Lubricator,

№ 78,895. Patented June 16, 1868.

United States Patent Office.

BENJAMIN H. REYNOLDS, OF CANTERBURY, AND JOHN BACHELDER, OF NORWICH, CONNECTICUT.

*Letters Patent No. 78,895, dated June 16, 1868.*

---

IMPROVEMENT IN LUBRICATING-DEVICE.

---

The Schedule referred to in these Letters Patent and making part of the same.

---

Be it known that we, BENJAMIN H. REYNOLDS, of Canterbury, in the county of Windham, and State of Connecticut, and JOHN BACHELDER, of Norwich, county of New London, and State aforesaid, have invented a new and improved Device for Lubricating Bearings of Machinery and Shafting; and we do hereby declare that the following is a full and exact description of the construction and operation of the same, reference being had to the annexed drawings, making a part of this specification, in which—

Figure 1:
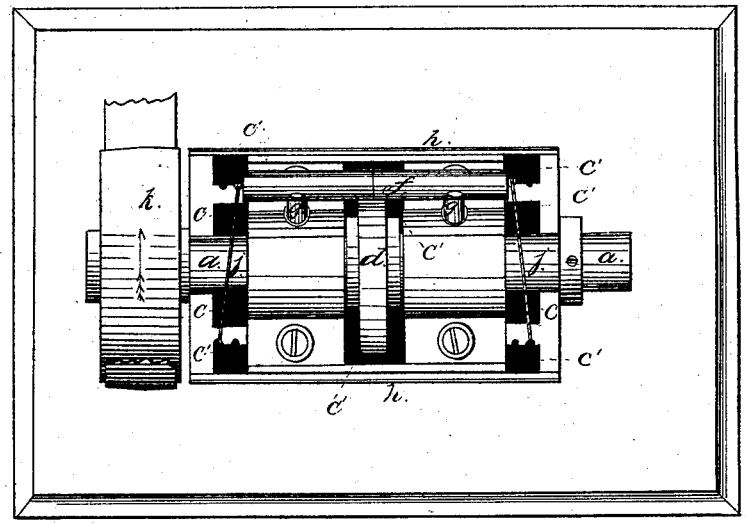
Figure 2:
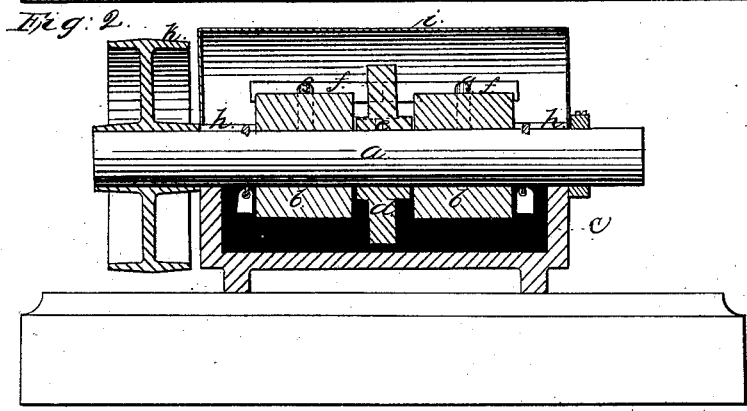
Figure 3:
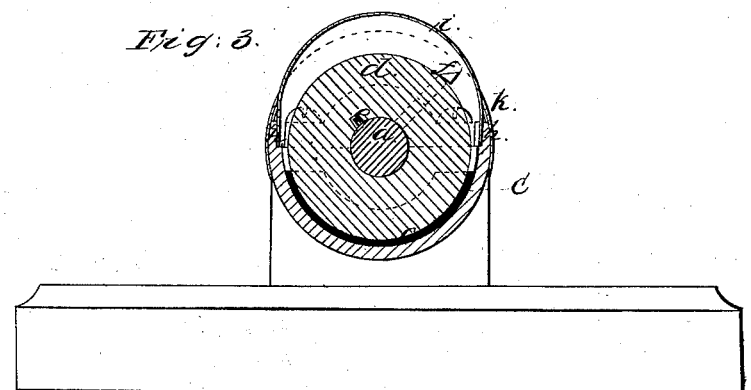

Figure 1 is a plan view, with the hood removed,

Figure 2 a longitudinal section parted through the centre of the shaft vertically, and Figure 3 a transverse section parted through the centre of the lubricating-wheel.

$a$ represents the shaft, supported in bearings $b\ b$, to which is attached the oil-reservoir $c\ c$.

$d$ represents the lubricating-wheel, which, when used on lines of shafting, is fitted loosely on the shaft, and made to revolve with it by means of the pin $e$, set in the shaft at the end of the hub, in the direction the shaft expands, and projecting into the groove in its hub. The hub should be long enough to keep the pin in the groove during the extremes of expansion and contraction; the object of this arrangement being to allow the lubricating-wheel $d$ to keep its relative position when the shaft expands or contracts; but on short shafts in machinery, saw-arbors, &c., we shrink it on to the shaft, which provides a substitute for collars or shoulders on the shaft, to prevent a longitudinal motion.

The conducting-trough $f$ is set near and receives oil from the periphery of the lubricating-wheel $d$, carried up and thrown off by centrifugal force, and returns it to the journal-bearings through the tubes $g\ g$. When bearings are provided each side of the lubricating-wheel, the trough $f$ has a partition at the centre of the wheel, which causes a portion of the oil to flow to each bearing. The walls $h\ h$, running longitudinally on the edges of the reservoir, and rising above the centre of the shaft, prevent any overflow of oil raised by the lubricating-wheel. The hood $i$ covers the whole box, excluding floating dust in the room, and intercepting surplus oil thrown off by centrifugal force.

$j\ j$ represent wipers made of flexible cords or their equivalents, drawn diagonally across the shaft, with an inclination towards the lubricating-wheel $d$, in the direction it is running, to prevent oil flowing on the shaft beyond the reservoir.

Having explained the object for which the several parts are designed, we will proceed to show the effect when put in operation.

Oil is placed in the reservoir $c$ in quantity sufficient to touch the periphery of the lubricating-wheel $d$. The shaft $a$ being driven at the requisite speed by power communicated by the belt on the pulley $k$, the oil is thrown up by centrifugal force, and caught by the conducting-trough $f$, and discharged upon the bearings through the tubes $g\ g$ and holes in the caps of the boxes. This oil and the overflow drop into the reservoir $c$, through the openings $c'$, making the operation continuous.

What we claim, and desire to secure by Letters Patent, is—

1. The wipers $j\ j$.

2. The arrangement of the pin $e$ and groove in the hub of the lubricating-wheel $d$, to provide for expansion and contraction.

BENJAMIN H. REYNOLDS,
JOHN BACHELDER.

Witnesses:
JNO. T. WAIT,
EDWARD N. ST. THOMAS.